C. RANDALL.
Cotton-Planter.
No. 9,370.
Patented Nov. 2, 1852.
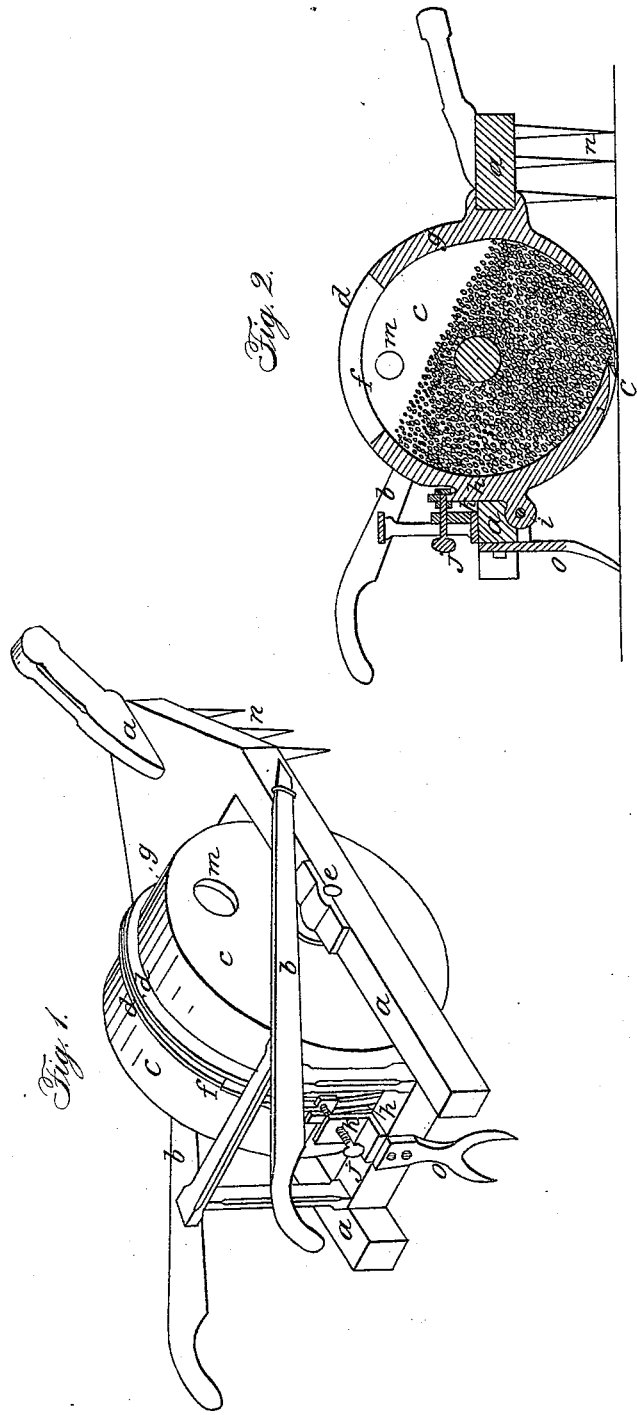

UNITED STATES PATENT OFFICE.

CHARLES RANDALL, OF PALMYRA, GEORGIA.

IMPROVEMENT IN SEED-PLANTERS.

Specification forming part of Letters Patent No. 9,370, dated November 2, 1852.

*To all whom it may concern:*

Be it known that I, CHARLES RANDALL, of Palmyra, in the county of Lee and State of Georgia, have invented certain new and useful Improvements in Constructing Seed-Drills for Dropping Cotton and other Seed; and I do hereby declare that the following is a full, clear, and exact description thereof, reference being had to the accompanying drawings and letters marked thereon, forming a part of this specification.

All contrivances heretofore known or used, as far as I am acquainted, for dropping cotton-seed have proved ineffectual, owing principally to the lightness and fuzzy surface of this description of seed, causing them, particularly in damp weather, to adhere, cake together, and obstruct the passage or aperture leading from the hopper, thus rendering the dropping irregular and uncertain.

My invention consists in a novel and peculiar arrangement of drill constructed with particular reference for adapting it to the dropping of cotton-seed; but it can be used with nearly equal advantage for a variety of other seed.

The principal feature of novelty consists in so constructing the carrying-wheel that it shall perform the several functions of serving as a hopper to contain the seed, a plow to open the furrow, and a support for the implement, thus reducing the machine to great simplicity, compactness, and also durability.

The accompanying drawings represent an isometrical view and a longitudinal vertical section through the center.

The same letters refer to like parts in each of these figures.

$a\ a$ is the plow beam or frame, to which the horse or other animal employed to propel it is attached, provided with helves or handles $b\ b$, and resembling so far an ordinary drill. The hopper, plow, and main wheel consist of two hollow disks, $c\ c$, of about eighteen inches in diameter, six inches broad, (more or less,) with projecting flanges $d\ d$, about one and one-half inch broad, which serve as plows to open the furrow and to conduct the seed into the bottom of the furrow in a straight line. These disks are firmly and permanently secured to and rotate with the shaft $e$, not close together, but so as to have a space or opening, $f$, about three-eighths of an inch wide (more or less) between the flanges. Secured to the front part of the beam, in any well-known manner, is a segment-plate, $g$, which fits the opening or space $f$ between the flanges, and it extends down under the beam to about a perpendicular line drawn from the tread and across the axis of the disks, and it also projects above the beam sufficiently high to prevent the seed from escaping and to allow the disks with the shaft to be removed, and also to prevent the dirt from collecting and clogging the opening or space $f$ between the flanges. This plate, filling the space up flush with the periphery of the wheel, makes a smooth bottom to the furrow, so that the seeds will fall in a straight line and in the center and bottom of the furrow. Opposite to this, and on the rear end of the beam, is another segment-plate, $h$, which may be called a "tongue" or "seed-regulator," fitting the opening $f$ in the same manner as $g$; but instead of being secured to the beam it is jointed thereto at $i$, and is provided with an adjustable screw, $j$, working loosely in the end of it, but through a thread in the bracket $k$, so that by turning said screw the tongue can be elevated or depressed at its lower end, $l$, which has the effect of increasing or diminishing the aperture or opening through which the seed are discharged, and thus regulating the discharge as desired.

The disks, as before stated, are hollow and contain the seed, which is introduced through a hole, $m$, which is closed by a suitable cover. As the disks rotate the seed keep to the bottom and fall through the opening or discharge-aperture between the segment-plates. The constant rotary motion of the seed will prevent them from adhering or caking, thus producing a regular and sure discharge.

In the front end of the plow-beam is provided a series of teeth, $n$, to harrow the ground previous to laying open the furrow, and secured to the after part is a fork or board, *o*, for covering in the furrow over the seed.

Having thus fully described my invention, what I claim as new, and desire to secure by Letters Patent, is—

The two hollow disks, combining a hopper, plow, and carrying-wheel, substantially as described, in combination with the segment-plates *g* and *h*, or their equivalents, by which the discharge of seed is regulated, operating substantially as in the manner and for the purpose herein fully set forth.

In testimony whereof I have hereunto signed my name before two subscribing witnesses.

CHAS. RANDALL.

Witnesses:
  J. S. SMITH,
  GEO. R. WEST.